United States Patent
Taguchi

[11] Patent Number: 6,027,784
[45] Date of Patent: Feb. 22, 2000

[54] CONNECTING ROD

[75] Inventor: Hitoshi Taguchi, Omiya, Japan

[73] Assignee: Fuji Jukogyo Kabushiki Kaisha, Tokyo, Japan

[21] Appl. No.: 08/984,537

[22] Filed: Dec. 3, 1997

[30] Foreign Application Priority Data

Dec. 20, 1996 [JP] Japan ................................ 8-341734

[51] Int. Cl.[7] ............................... B32B 3/24; G05G 1/00
[52] U.S. Cl. ..................... 428/131; 428/138; 74/579 E; 74/579 R; 74/493; 123/90.61
[58] Field of Search .................... 428/131, 138; 74/579 F, 579 DR, 593; 123/90.61

[56] References Cited

U.S. PATENT DOCUMENTS

| | | | |
|---|---|---|---|
| 2,473,096 | 6/1949 | Hamill et al. | 74/579 E |
| 4,102,589 | 7/1978 | Haas et al. | 403/373 |
| 4,422,348 | 12/1983 | Campbell | 74/579 E |
| 5,524,507 | 6/1996 | Olmr et al. | 74/579 E |
| 5,660,086 | 8/1997 | Carey | 74/579 E |

FOREIGN PATENT DOCUMENTS

| | | |
|---|---|---|
| 61-94613 | 6/1986 | Japan . |
| 3-48416 | 5/1988 | Japan . |
| 4-8906 | 1/1992 | Japan . |

Primary Examiner—William P. Watkins, III
Attorney, Agent, or Firm—Smith, Gambrell & Russell, LLP

[57] ABSTRACT

A connecting rod comprises a rod body having a small end and a base end provided with a threaded hole, and a cap provided with a through hole corresponding to the threaded hole to be joined to the base end of the rod body with screws to form a large end. The joining surface of the base end to which the joining surface of the cap is to be joined is inclined to a plane perpendicular to the longitudinal axis of the rod body. The threaded hole of the base end is formed by tapping a preformed hole by means of advancing a drill from the joining surface of the base end obliquely toward the longitudinal axis of the rod body. The preformed hole has a bottom in a wall forming the rod body, and a chip removing hole is formed in a side surface of the wall of the rod body so as to be connected to the bottom of the preformed hole for the threaded hole.

9 Claims, 2 Drawing Sheets

CONNECTING ROD

BACKGROUND OF THE INVENTION

1. Field of the Invention

The present invention relates to a connecting rod with a slanted large end.

2. Description of the Related Art

In general, a large end of a connecting rod, similarly to that of a connecting rod disclosed in Japanese Patent Laid-Open Publication (KOKAI) No. 4-8906, is split along a plane perpendicular to a longitudinal axis of the connecting rod into a cap and a base end formed integrally with a rod body. The cap is joined and fastened to the base end with screws to hold the connecting rod on a crankpin of a crankshaft. Threaded holes are formed in the base end. The holes in most cases are through holes.

In the connecting rod with a slanted large end having an axis inclined to that of a rod body, such as disclosed in Japanese Utility Model Laid-Open Publication (KOKAI) No. 61-94613 or Japanese Utility Model Publication (KOKOKU) No. 3-48416, for a V-type engine or a slanted engine, an axis of one of precast or preformed holes formed in the large end extends toward the axis of the rod body, and hence the strength of the large end is reduced if the preformed hole having the axis extending toward the axis of the rod body is a through hole. Therefore, the preformed hole having the axis extending toward the axis of the rod body is formed in a bottomed hole with a necessary depth. If the preformed hole has a bottom end, chips produced by drilling are liable to be accumulated in the bottom end of the preformed hole. Therefore, such a bottomed hole needs a special process for removing the accumulated chips, and hence increases man-hours necessary for the manufacture of the connecting rod. The chips accumulated in the bottomed hole may be removed simply by blowing air into the bottomed hole, which causes to scatter the chips and worsens the working environment.

SUMMARY OF THE INVENTION

Accordingly, it is an object of the present invention to provide a connecting rod with high reliability which enables accumulated chips to be removed simply without requiring any special process and improves quality control.

According to one aspect of the present invention, a connecting rod comprises a rod body having a small end and a base end provided with a threaded hole; and a cap provided with a through hole corresponding to the threaded hole to be joined to the base end of the rod body with fastening means (screws) to form a large end. A joining surface of the base end to which a joining surface of the cap is to be joined is inclined to a plane perpendicular to a longitudinal axis of the rod body. The threaded hole of the base end is formed by tapping a preformed hole by means of advancing a drill from the joining surface of the base end obliquely toward the longitudinal axis of the rod body. The preformed hole has a bottom in a wall forming the rod body, and a chip removing hole (recess) is formed in a side surface of the wall of the rod body so as to be connected to the bottom of the preformed hole for the threaded hole.

According to the present invention, the chip removing hole is formed in the side surface of the rod body so as to be connected to the bottom of the preformed hole for the threaded hole. Thus, chips produced during machining operations for forming the preformed hole and forming the internal thread can be easily removed. Preferably, the chip removing hole is formed in a shape of a recess to avoid reducing the strength of the connecting rod. Preferably, the rod body provided with the chip removing hole is formed by casting.

A preferred embodiment of the present invention will become understood from the following detailed description referring to the accompanying drawings.

DESCRIPTION OF THE PREFERRED EMBODIMENTS

Figure 3:
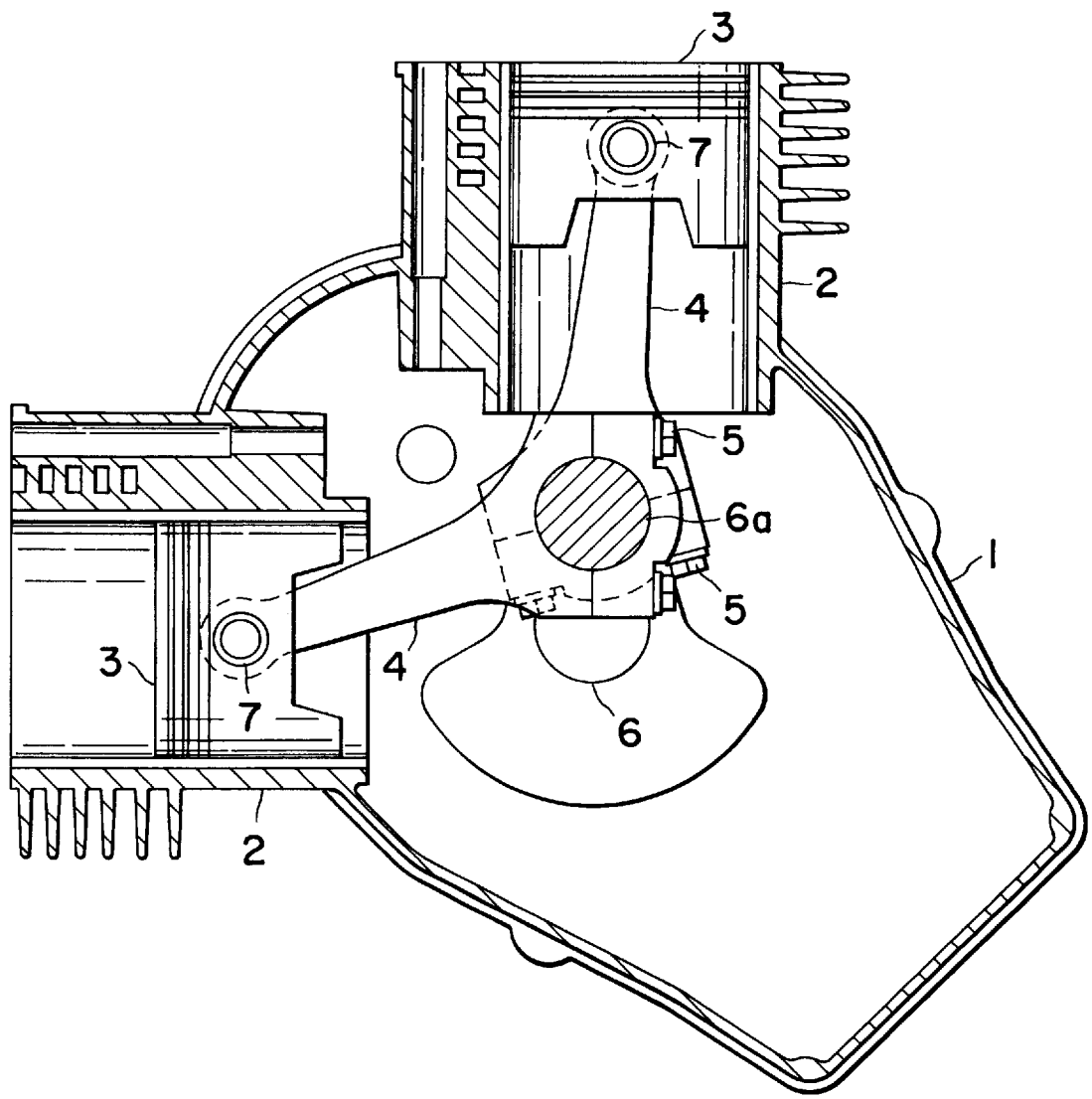
FIG. 3 is a sectional view of a V-type engine.

Referring to FIG. 3 showing an essential portion of a V-type engine in a sectional view, a plurality of cylinders 2 are arranged side by side in two planes making an angle with each other on a crankcase 1, and a plurality of pistons 3 in the cylinders 2 are respectively connected by connecting rods 4 to crankpins 6a included in a crankshaft 6 longitudinally extended in the crankcase 1.

Figure 1:
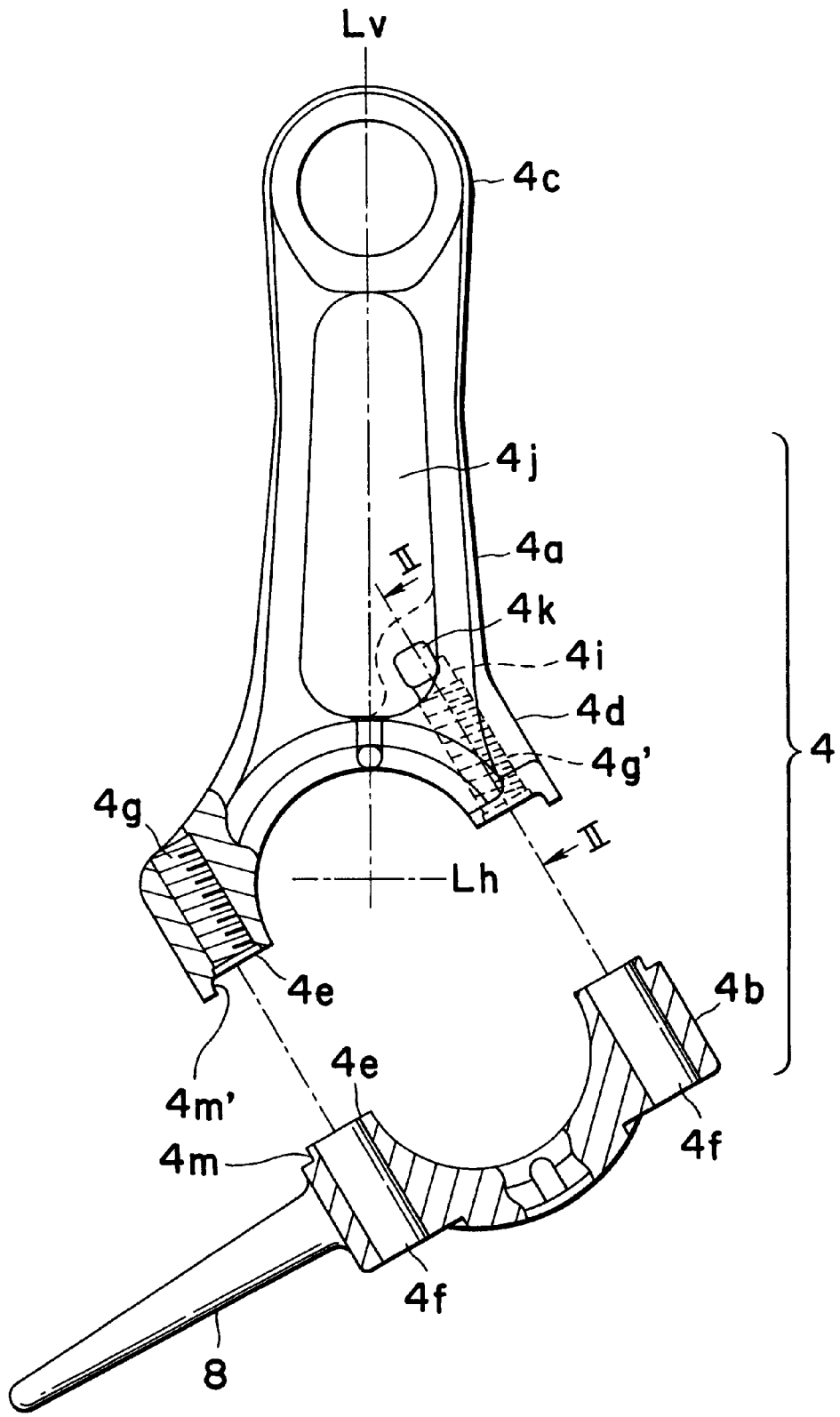
FIG. 1 is a partly sectional front view of a connecting rod in a preferred embodiment according to the present invention.
Figure 2:
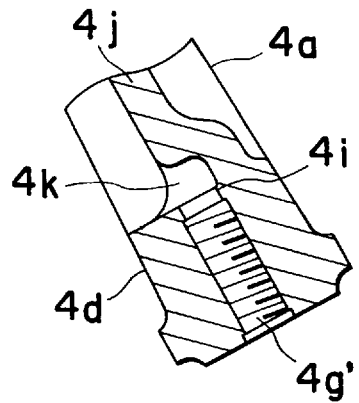
FIG. 2 is a sectional view taken on line II—II in FIG. 1.

As shown in FIG. 1, each of the connecting rods 4 has a rod body 4a having one end formed in a small end 4c and the other end formed in a substantially semicylindrical base end 4d, and a cap 4b to be joined to the base end 4d. The base end 4d is put on the crankpin 6a of the crankshaft 6, and the cap 4b is joined to the base end 4d with screws 5 to form a large end and to connect the connecting rod 4 to the crankpin 6a of the crankshaft 6. The small end 4c of the connecting rod 4 is connected to a piston pin 7 attached to a piston 3. The respective centers of the small end 4c and the base end 4d are on the center line (longitudinal axis) Lv of the rod body 4a, and the respective joining surfaces 4e of the cap 4b and the base end 4d are inclined to a plane Lh perpendicular to the center line Lv. A pair of opposite through holes 4f are formed in the cap 4b, and a pair of opposite threaded holes 4g and 4g' are formed in the base end 4d of the rod body 4a so as to coincide with the through holes 4f, respectively, when the cap 4b is joined to the base end 4d. The threaded hole 4g farther from the center line Lv than the other threaded hole 4g' is formed through a portion of the base end 4d. A preformed hole for the other threaded hole 4g' neighboring the center line Lv than the threaded hole 4g is terminated in a thin wall 4j of the rod body 4a so that the bottom 4i of the preformed hole lies in the thin wall 4j because the strength of the rod body 4a will be reduced if the preformed hole for the threaded hole 4g' is formed through the rod body 4a. A chip removing hole 4k having a shape with a recess of a predetermined depth is formed in one side surface of the thin wall 4j so as to be connected to the bottom 4i of the preformed hole for the threaded hole 4g'.

As shown in FIG. 1, the cap 4b is provided with a lubricating scraper 8 for splashing the oil in an oil pan (not shown), connected to the crankcase 1 for splashing. A positioning step 4m and a positioning projection 4m' are formed in the cap 4b and the base end 4d, respectively, to position the cap 4b correctly on the base end 4d.

The threaded holes 4g and 4g' are formed by tapping preformed holes formed in the base end 4d of the rod body 4a. The preformed hole for the threaded hole 4g' is formed by advancing a drill toward the center line Lv of the rod body 4a, and the bottom 4i of the preformed hole is connected to the chip removing hole 4k formed in the side surface of the rod body 4a. Therefore, chips produced when forming the threaded hole 4g' can be removed through the chip removing hole 4k and hence the chips will not remain in the bottom 4i of the tap drill hole. If air is blown through the open end of the threaded hole 4g' in the joining surface 4e into the threaded hole 4g' after completing the threaded hole 4g', the air flows through the threaded hole 4g' and the chip removing hole 4k together with the chips to discharge the chips forcibly from the threaded hole 4g'. Thus, the chips can be simply and completely removed from the threaded hole 4g' without requiring any special process and without scattering the chips, so that perfect quality control is facilitated, man-hours can be reduced and the working environment can be kept clean.

If the rod body 4a is formed by die-casting, the chip removing hole 4k can be formed in the rod body 4a by a die-casting process for casting the rod body 4a.

While the presently preferred embodiment of the present inventiion has been shown and described, it is to be understood that this disclosure is for the purpose of illustration and various changes and modifications may be made without departing from the scope of the invention as set forth in the appended claims.

What is claimed is:

1. A connecting rod for connecting a piston to a crank pin of a crankshaft, said connecting rod comprising:

a rod body made by casting and having a small end, a base end and a shank end portion connecting said small end, and said shank portion having a thin wall portion in a central part thereof, said base end being provided with a pair of threaded holes being a first threaded hole and a second threaded hole inclined to a longitudinal line of said rod body, said rod body having a chip removing hole formed in said thin wall portion so as to be connected to an opening in said second threaded hole; and a cap being joined to said base end with fastening means to form a slanted large end, said cap being provided with a pair of through holes respectively corresponding to said first and second threaded holes;

wherein each of said threaded holes is formed by tapping a preformed hole formed in said base end while chips produced in said second threaded hole are removed through said chip removing hole.

2. The connecting rod according to claim 1, wherein said base end and said cap respectively has a pair of positioning members so as to position said cap correctly on said base end.

3. The connecting rod according to claim 1, wherein said chip removing hole has a shape of a recess with a predetermined depth.

4. The connecting rod according to claim 1 wherein respective joining surface of said cap and said base end are inclined to a plane perpendicular to said longitudinal line.

5. The connecting rod to claim 1 wherein said second threaded hole opens out to said thin wall portion of said shank.

6. The connecting rod according to claim 5 wherein said second threaded hole is nearer the longitudinal line than said first threaded hole.

7. An engine having at least one connecting rod according to claim 1.

8. An engine having at least one connecting rod according to claim 2.

9. An engine having at least one connecting rod according to claim 3.

* * * * *